United States Patent [19]
Edlinger

[11] Patent Number: 6,139,621
[45] Date of Patent: Oct. 31, 2000

[54] PROCESS FOR PRODUCING SULFATE CEMENT OR SULFATE CEMENT AGGREGATES

[75] Inventor: Alfred Edlinger, Baden, Switzerland

[73] Assignee: "Holderbank" Financiere Glarus AG, Glarus, Switzerland

[21] Appl. No.: 09/202,063

[22] PCT Filed: Mar. 12, 1998

[86] PCT No.: PCT/AT98/00066

§ 371 Date: Dec. 8, 1998

§ 102(e) Date: Dec. 8, 1998

[87] PCT Pub. No.: WO98/34469

PCT Pub. Date: Aug. 13, 1998

[30] Foreign Application Priority Data

Apr. 9, 1997 [AT] Austria ..................................... 611/97

[51] Int. Cl.$^7$ .................................................. C04B 11/00
[52] U.S. Cl. ........................... 106/715; 106/776; 106/782
[58] Field of Search ..................... 106/715, 776, 106/782, 789

[56] References Cited

U.S. PATENT DOCUMENTS

| | | | |
|---|---|---|---|
| 2,248,032 | 7/1941 | Dunn . | |
| 4,266,980 | 5/1981 | Chudo et al. | 106/900 |
| 4,306,910 | 12/1981 | Miyoshi et al. | 405/266 |
| 4,367,986 | 1/1983 | Miyoshi et al. | 405/266 |
| 4,443,260 | 4/1984 | Miyoshi et al. | 405/128 |
| 4,652,310 | 3/1987 | Tormari et al. . | |
| 5,273,579 | 12/1993 | Tanaka et al. | 106/715 |
| 5,395,443 | 3/1995 | Hooykaas . | |

FOREIGN PATENT DOCUMENTS

| | | |
|---|---|---|
| 2 203 786 | 2/1973 | France . |
| 2 370 006 | 11/1977 | France . |
| 430629 | 10/1938 | Italy . |
| 0297445 | 4/1990 | Japan . |
| 10245555 | 9/1998 | Japan . |
| 9 201 266 | 7/1992 | Netherlands . |
| 1085949 | 4/1984 | U.S.S.R. . |
| 1708788 | 1/1992 | U.S.S.R. . |
| 1 386 507 | 3/1975 | United Kingdom . |
| 1 556 833 | 11/1979 | United Kingdom . |

OTHER PUBLICATIONS

"Sulfate–Slag Cement Production" vol. 7, pp. 6–7 V.V. Omelchado (Abstract Only), Karagard Tsem. Zavod, Karaganda USSR (1969).

*Primary Examiner*—Paul Marcantoni
*Attorney, Agent, or Firm*—Pillsbury Madison & Sutro LLP

[57] ABSTRACT

Sulfate cement or sulfate cement aggregates are produced herein by a process in which hydraulically active synthetic slags having slag basicities $CaO/SiO_2$ of between 1.35 and 1.6, $Al_2O_3$ contents of 10% by weight to 20% by weight, and iron oxide contents of below 2.5% by weight are mixed with an earth alkali sulfate in an amount of 5% by weight to 20% by weight, based on the overall weight of the mixture. The hydraulically active synthetic slags can be made by mixing at least one member selected from the group consisting of waste incineration slags and blast furnace slags with steel slags to produce a melt and reducing metal oxides contained in the melt. The earth alkali sulfate is selected from the group consisting of crude gypsum, waste gas gypsum, smoke gas desulfurization plant gypsum, gypsum, or anhydrite in ground or comminuted form.

10 Claims, No Drawings

PROCESS FOR PRODUCING SULFATE CEMENT OR SULFATE CEMENT AGGREGATES

FIELD OF THE INVENTION

1. Background of the Invention

The invention relates to a process for producing sulfate cement or sulfate cement aggregates.

2. Description of the Related Art

It was discovered at the beginning of this century that granulated blast furnace slags may be stimulated to hydraulically set not solely by lime or portland cement, but that such slags are capable of solidifying also when combined with gypsum in amounts ranging from approximately 10 to 15% by weight. Despite such findings, the technological application of these findings remained limited. Gypsum being a representative of sulfates, bears the risk of inducing gypsum blowing. The space required locally gypsum blowing due to the reaction product being rich in crystalline water will create an explosive effect. This, above all, applies to those cases where, as with known sulfate slag cements, initial solidification could be triggered only by admixtures of portland cement clinker as a lime carrier. With known sulfate slag cements, blast furnace slag was ground together with 15% by weight of calcium sulfate in the form of crude gypsum and approximately 2% by weight of portland cement was added. The presence of lime hydrate in the first stage of solidification proved to be necessary because otherwise a dense gel layer would primarily form before sulfatic setting occurred.

It is important to note that the solidification mechanism of sulfate slag cements must not be compared to the alkaline excitation of the hydration process in case of portland cements. With slag cements, the presence of lime hydrate suffices to induce hydration, whereas in the case of known sulfate slag cements a true reaction must take place, in the course of which gypsum is converted into calcium sulfoaluminate. The sulfoaluminate causes the necessary solidification. The fact that gypsum blowing must be safely avoided has led to the requirement of observing a high grinding fineness amounting to at least 4000 to 6000 $cm^2/g$ with known slag cements. In any event it turned out that the majority of blast furnace slags were unsuitable for the production of sulfate slag cement. This especially applies because common blast furnace slags, generally, have relatively low alumina contents such that the desired formation of sulfoaluminates is infeasible or only to an insufficient degree, thus not eliminating the risk of gypsum blowing. Finally, a high content of lime is required; however, lime is generally not found in blast furnace slags. For all the reasons mentioned above, sulfate slag cements have not gained any importance in construction practice.

DETAILED DESCRIPTION OF THE INVENTION

The invention aims at providing a process of the initially defined kind by which it is feasible to obtain cement or cement aggregates which exhibit excellent sulfate and sea water resistances and are capable of being used, for instance, as bore hole cements with the danger of gypsum blowing being safely avoided. To solve this object, the process according to the invention essentially resides in that hydraulically active synthetic slags having slag basicities $CaO/SiO_2$ of between 1.35 and 1.6 such as, for instance, waste incineration slags and/or blast furnace slags mixed with steel slags upon reduction of metal oxides in the melt, and $Al_2O_3$ contents of 10 to 20% by weight and iron oxide contents of below 2.5% by weight are mixed with 5 to 20% by weight, based on the overall mixture, of an alkaline earth sulfate such as, e.g., crude gypsum, waste gas gypsum, smoke gas desulfurization plant gypsum, gypsum or anhydrite in the ground or comminuted form. By using a hydraulically active synthetic slag instead of naturally occurring slags, which, generally, do not at all meet the required demands, it has become feasible to provide the prerequisites for completely eliminating gypsum blowing and produce a cement or cement aggregate that stands out for its enhanced seawater resistance and enhanced sulfate resistance. By using a synthetic slag, it is feasible in the synthesis of the slag to adjust a slag basicity of between 1.35 and 1.6, which, as a rule, will not be attained by blast furnace slag. Adjustment to slag basicity is feasible, for instance, by mixing waste incineration slags with steel slags and reducing the metal oxides contained in such slags. Unless provided by the selected starting slag, the $Al_2O_3$ content in the melt may be adjusted to the preset values ranging between 10 and 20% by weight, wherein, by reducing the liquid slags, not only the content of heavy metals but also the content of iron oxides must be lowered to below 2.5% by weight in order to not observe any subsequent undesired side effects. By using such a highly purified synthetic slag, a number of materials difficult to dispose of, such as, for instance, smoke gas desulfurization plant gypsum, crude gypsum, waste gas gypsum, and even gypsum and anhydrite may be employed as alkaline earth sulfate carriers. In that case, the slag may be ground to a substantially lesser grinding fineness than has been the case with known sulfate slag cements and, in particular, it is not necessary to grind the slags together with gypsum as has been the case in the past in order to ensure accordingly good, homogenous thorough mixing. The mingling of crude gypsum with metallurgical slags, which is common in the production of sulfate slag cement, involves a number of difficulties in terms of grinding. Gypsum in such mixtures tends to be prone to smearing such that the desired grinding fineness cannot be readily attained. The high fineness demanded for the homogenous distribution of gypsum, as has been required with sulfate slag cements, therefore, can be obtained only with great difficulties. By contrast, when choosing the synthetic slag according to the invention, the slag may be ground to a substantially lesser grinding fineness and gypsum may be added in a likewise accordingly lesser grinding fineness subsequently, with the desired homogeneity of the mixture being obtainable, nevertheless.

In accordance with the invention, it is advantageously proceeded in a manner that a grinding fineness of the synthetic slags of between 2800 and 3500 $gm^2/g$ is chosen, such a grinding fineness being markedly smaller than the grinding fineness required for known sulfate slag cements.

In order to ensure the desired sulfoaluminate reaction to take place subsequently, it is advantageously proceeded in a manner that the $Al_2O_3$ content is adjusted to between 12 and 18% by weight.

Advantageously, $CaSO_4$ is used in amounts ranging between 8 and 15% by weight. Accordingly rapid hardening is guaranteed in that the slag basicity is chosen to be larger than 1.45 and, preferably, about 1.5.

The $Al_2O_3$ content in a particularly simple manner may be adjusted by the addition of clays or alumina, such an adjustment being feasible in the liquid slag phase.

Usually, about 16% by weight $SiO_2$, 50% by weight CaO and 1% by weight $Al_2O_3$ are contained in steel slags. Such steel slags, thus, may be employed as lime carriers to adjust the basicities of other slags such as, for instance, waste incineration slags, which mostly are to be regarded as acidic slags. Generally, blast furnace slags, likewise are to be regarded as acidic slags and most rarely are available at slag basicities larger than 1.1 or 1.2. Blast furnace slag cements usually contain $SiO_2$ in amounts of approximately 37% by weight and CaO in amounts of approximately 32% by weight. In such blast furnace slags, however, $Al_2O_3$ is generally contained in an amount of approximately 13% by weight such that mixtures of steel slags and blast furnace slags in the liquid form, after appropriate adjustment of the basicity of the $Al_2O_3$ content and after reduction of excessive chromium and iron contents of steel slags using, for instance, a metal bath, are suitable for a synthetic slag which can subsequently be processed to sulfate cement. The same holds for the use of waste incineration or refuse incineration plants, slags or dusts, which likewise must be prepurified by appropriate reduction over a metal bath because of the metal oxides contained therein, in order to be usable for the production of sulfate cement as a synthetic slag in an appropriate composition. Also waste incineration slags are to be regarded as acidic slags, such slags, as a rule, being characterized by an $Al_2O_3$ content ranging between 10 and 25% by weight and a basicity of less than 0.5. Such slags, thus, contain portions of $SiO_2$ that are substantially higher than those of CaO and, considered as such, also are not suitable as starting materials without appropriate adjustment of the basicity and appropriate reduction of the metal oxides. Also in that case, the slag mixture which is suitable for the hydraulically active synthetic slag sought must be adjusted in the liquid phase in order to safeguard the desired basicity values of between 1.35 and 1.6, wherein only these basicities will ensure that the sulfoaluminate reaction is rendered feasible without primary hydration using lime hydrate and/or portland cement, since otherwise the formation of a gel layer would impede that reaction.

EXAMPLES

For comparative reasons, a sulfate slag cement was produced and compared to a cement produced according to the invention. That comparison proved that the compressive strength development with the cement according to the invention was characterized by an elevated final strength at a slightly reduced strength after 3 days. The compressive strength values after 3 days amounted to 41 $N/mm^2$ for sulfate slag cement as opposed to 38 $N/mm^2$ for the cement according to the invention. After 28 days, a compressive strength of 76 $N/mm^2$ could be obtained with sulfate slag cement, whereas the cement of the invention yielded values of 82 $N/mm^2$. The bending strength was approximately twice as high with the cement according to the invention as with known sulfate slag cements. Sulfate slag cement reached a bending strength of 7 $N/mm^2$, whereas values of 14 $N/mm^2$ were obtained with the cement according to the invention.

During those comparative tests, it was observed that the cement according to the invention stood out for its substantially slighter tendency to shrink. While the formation of cracks was observed with slag cements and usual blast furnace slag mixed cements, crack formation was largely excluded, and indeed not observed, with the cement according to the invention due to the substantially reduced tendency to shrink.

The grinding fineness was determined after Blaine according to ASTM standard C 204-55 in the course of the assays. The sulfate slag cement used in the comparative tests was ground substantially more costly and finely and employed at a grinding fineness of 5000 $cm^2/g$, whereas the cement according to the invention used in the comparative tests was ground to a grinding fineness of 3000 $cm^2/g$ only.

What is claimed is:

1. A process for producing sulfate cement or sulfate cement aggregates, said process comprising forming a mixture comprising hydraulically active synthetic slags and an alkaline earth sulfate, the hydraulic active synthetic slags in combination having a slag basicity $CaO/SiO_2$ of between 1.35 and 1.6, wherein the mixture has an $Al_2O_3$ content of 10% by weight to 20% by weight and an iron oxide content of below 2.5% by weight, and wherein the alkaline earth sulfate Constitutes 5% by weight to 20% by weight of the mixture.

2. The process of claim 1, further comprising preparing the hydraulically active synthetic slags by mixing at least one member selected from the group consisting of waste incineration slags and blast furnace slags with steel slags to produce a melt and reducing metal oxides contained in the melt.

3. The process of claim 1, wherein the alkaline earth sulfate is selected from the group consisting of crude gypsum, waste gas gypsum, smoke gas desulfurization plant gypsum, gypsum, and anhydrite in ground or comminuted form.

4. The process of claim 2, wherein the alkaline earth sulfate is selected from the group consisting of crude gypsum, waste gas gypsum, smoke gas desulfurization plant gypsum, gypsum, and anhydrite in ground or comminuted form.

5. The process of claim 1, wherein the hydraulically active synthetic slags are between 2800 and 3500 $gm^2/g$ in grinding fineness.

6. The process of claim 1, further comprising adjusting the $Al_2O_3$ content of the mixture to between 12% by weight and 18% by weight.

7. The process of claim 6, wherein said adjusting of the $Al_2O_3$ content comprises adding clays or alumina.

8. The process of claim 1, wherein $CaSO_4$ is in a range of from 8% by weight to 15% by weight in content based on the overall weight of the mixture.

9. The process of claim 1, wherein the slag basicity is between 1.45 and 1.6.

10. The process of claim 1, wherein the slag basicity is between 1.5 and 1.6.

* * * * *